June 21, 1960
R. LEE
2,941,414
FRICTION CLUTCH MECHANISM
Filed March 30, 1954
3 Sheets-Sheet 1
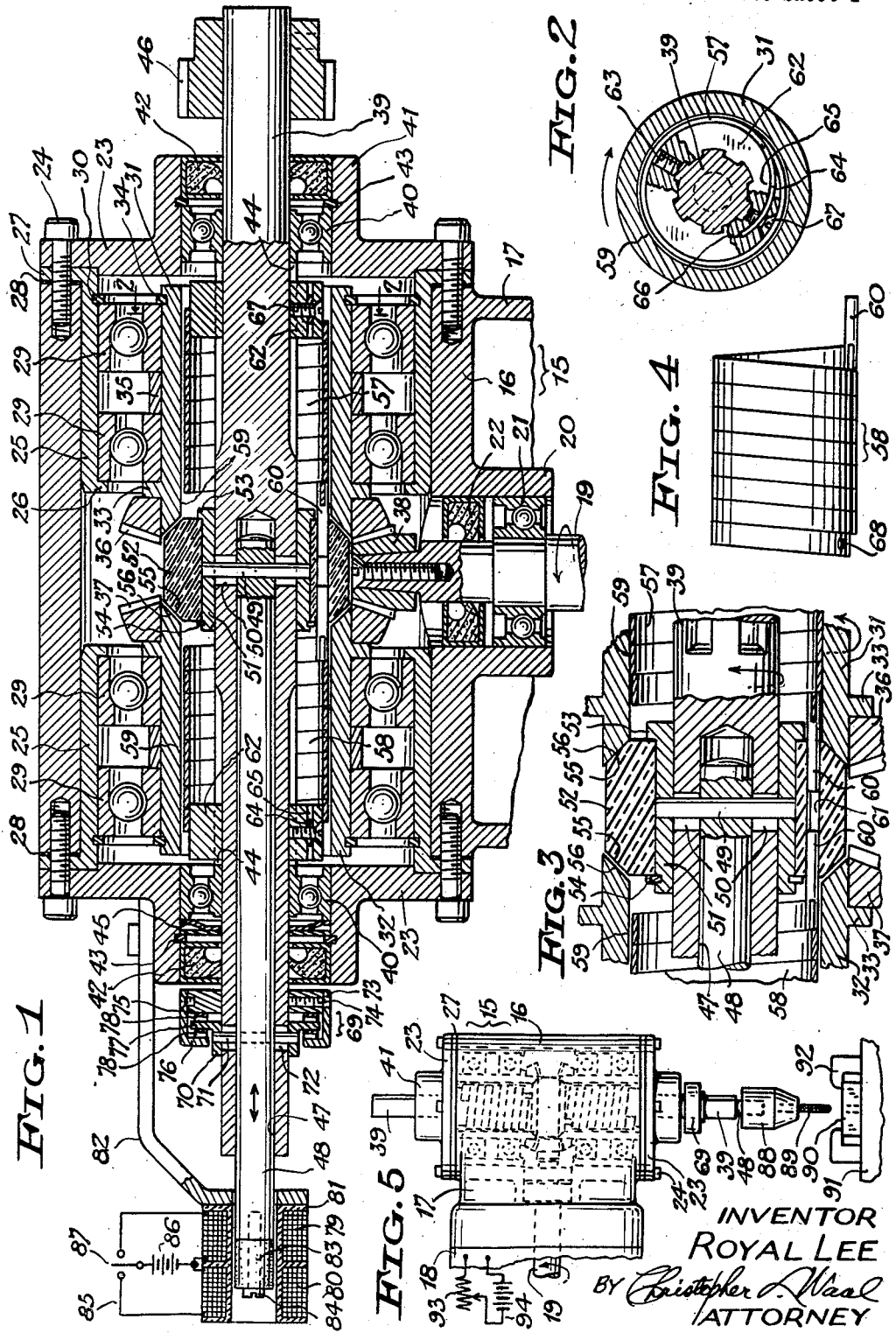
INVENTOR
ROYAL LEE
BY Christopher L. Neal
ATTORNEY

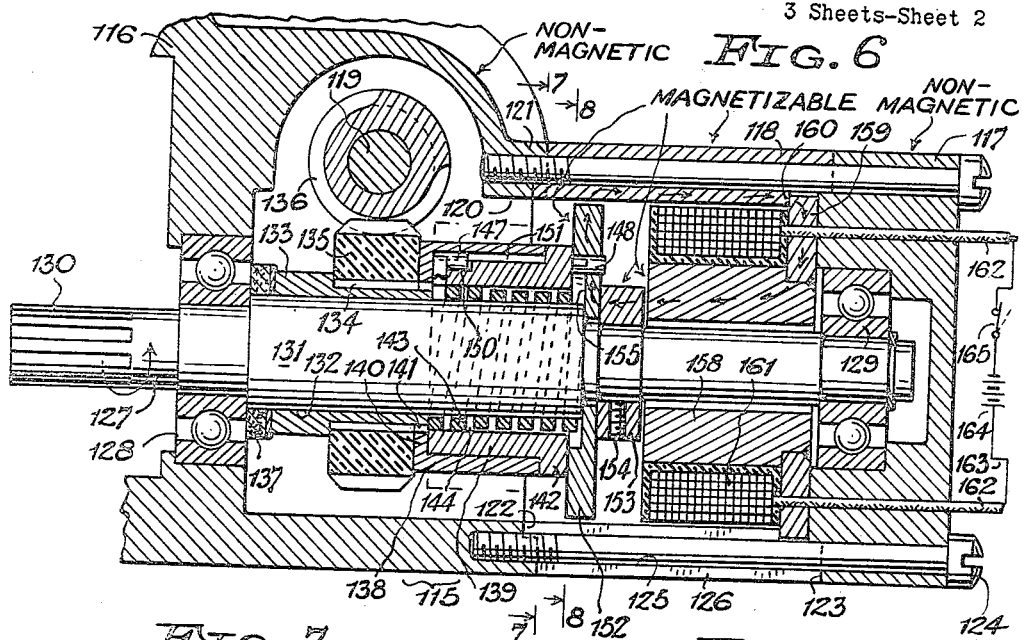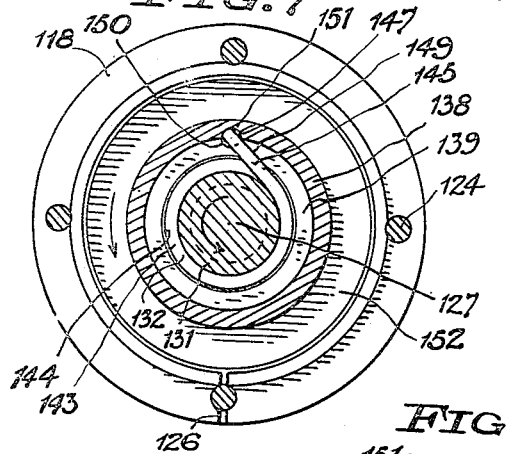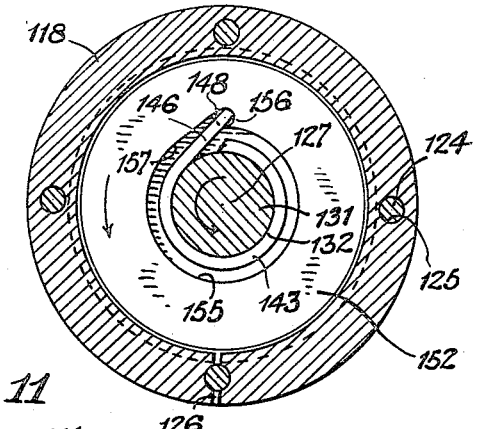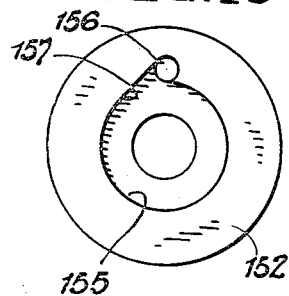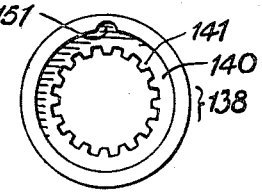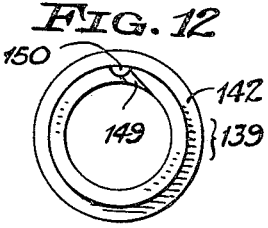
INVENTOR
ROYAL LEE
BY Christopher L. Waal
ATTORNEY

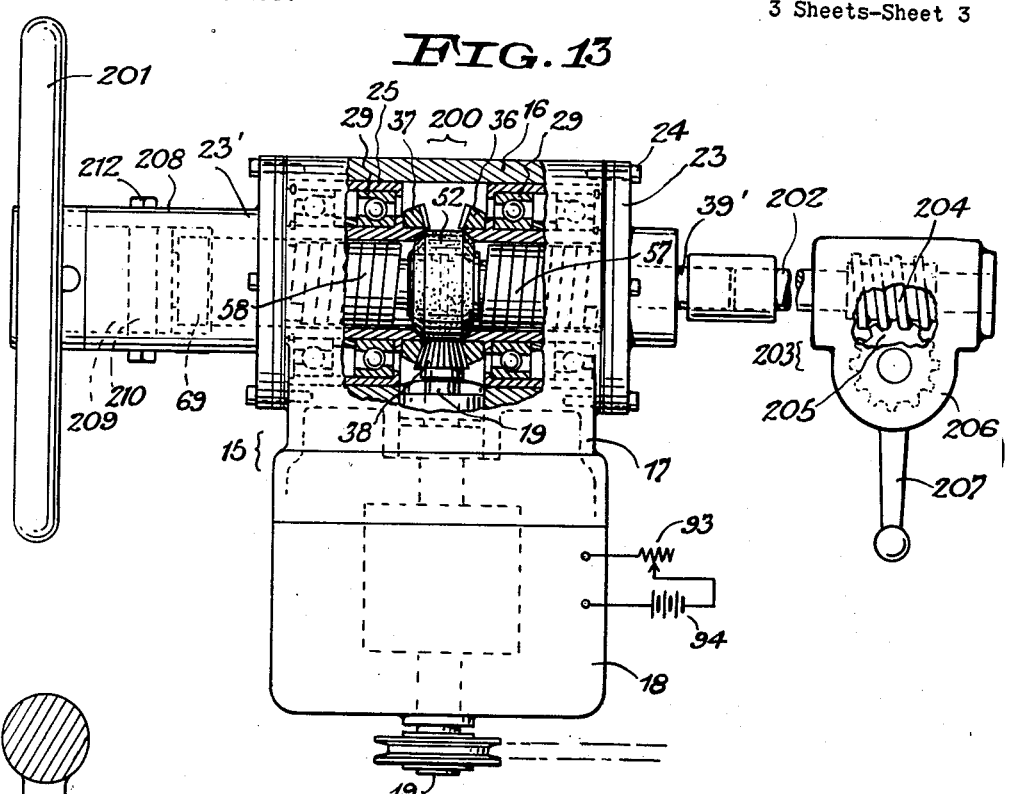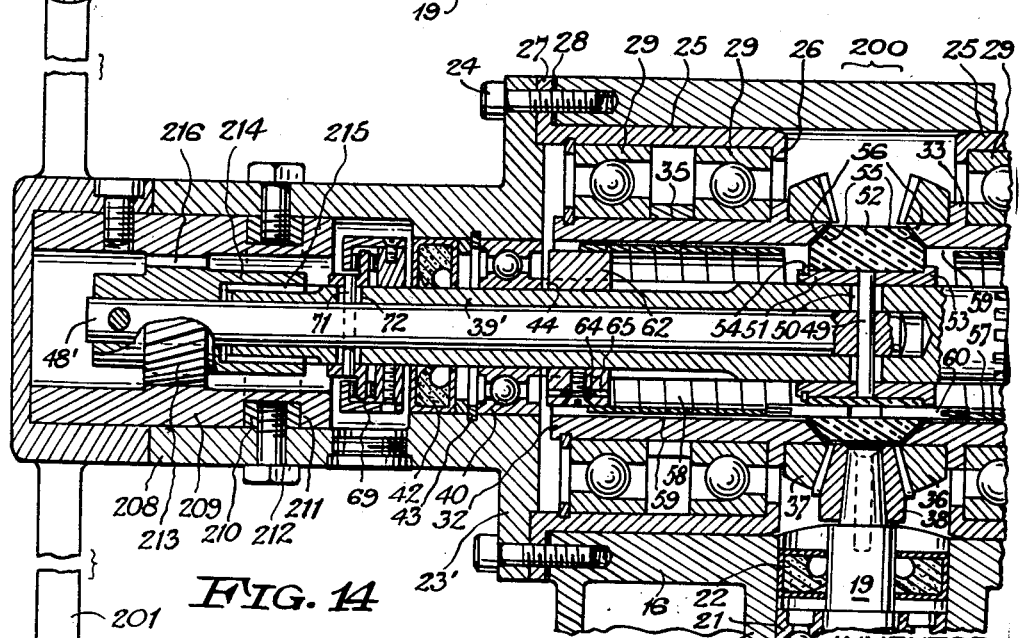

United States Patent Office 2,941,414
Patented June 21, 1960

2,941,414
FRICTION CLUTCH MECHANISM

Royal Lee, Elm Grove, Wis., assignor to Lee Engineering Company, Milwaukee, Wis., a corporation of Wisconsin Filed Mar. 30, 1954, Ser. No. 419,647

16 Claims. (Cl. 74—378)

The present invention relates to friction clutch mechanism of the type in which relatively rotatable members are coupled and uncoupled with respect to each other by a torque-transmitting friction coil spring.

An object of the invention is to provide an improved coil spring clutch mechanism of simple and durable construction which will minimize drag and wear, which can be easily and accurately actuated, and which is efficient and reliable in operation.

Another object is to provide a coil spring clutch mechanism including improved spring-energizing means which can be controlled in a simple manner and with relatively small effort.

Still another object is to provide a clutch mechanism including a plurality of coil spring clutch units and improved control means for selectively actuating the same.

A further object is to provide a multiple-unit coil spring clutch mechanism of this character arranged to transmit power to a reversible driven member and adapted for use in a tapping machine and the like.

A still further object is to provide a coil spring clutch mechanism including electromagnetic control means so arranged as to minimize drag on rotating parts.

The invention further consists in the several features hereinafter described and claimed.

In the accompanying drawings, illustrating certain embodiments of the invention:

Fig. 1 is a longitudinal sectional view of a reversible coil spring clutch mechanism constructed in accordance with the invention, the mechanism being shown in neutral condition;

Fig. 2 is a transverse sectional view taken generally on the line 2—2 of Fig. 1;

Fig. 3 is a fragmentary longitudinal sectional view of a spring-energizing portion of the mechanism, one of the clutch springs being in energized condition;

Fig. 4 is a detail side view of one of the clutch springs;

Fig. 5 is an elevational view of a modified form of reversible spring clutch mechanism incorporated in a tapping machine;

Fig. 6 is a longitudinal sectional view of another modified form of spring clutch mechanism, the mechanism being shown in energized condition;

Fig. 7 is a transverse sectional view taken generally on the line 7—7 of Fig. 6;

Fig. 8 is a transverse sectional view taken generally on the line 8—8 of Fig. 6;

Fig. 9 is a detail side view of a clutch spring for the mechanism of Fig. 6;

Fig. 10 is a detail view of a clutch energizing ring adapted to be coupled to an end of the spring;

Fig. 11 is a detail view of an outer spring housing member;

Fig. 12 is a detail view of an inner spring housing member;

Fig. 13 is a side view, partly in section, of a power steering mechanism embodying reversible coil spring clutch means of the invention, and Fig. 14 is a longitudinal sectional view of a portion of the mechanism including an operating connection with a steering wheel.

Referring to the forms of clutch mechanism illustrated in Figs. 1 to 4 and in Fig. 5, 15 designates a gear housing having a hollow cylindrical portion 16 and a hollow lateral portion 17, the latter adapted to be secured to a power device, such as an electric motor 18, Fig. 5, having a shaft 19. Within the lateral housing portion 17 the cylindrical housing portion 16 is provided midway of its length with a radially projecting tubular boss 20 mounting therein a ball bearing 21 and a shaft seal 22 for the motor shaft 19, the shaft extending at right angles to the axis of the housing portion 16. Cover plates 23 close the opposite ends of the cylindrical housing portion 16 and are secured thereto by screws 24. The closed housing portion 16 forms therein a lubricant chamber.

Bearing carrier sleeves 25 fit in the opposite ends of the cylindrical housing portion 16 and each has an inturned annular flange 26 at its inner end and an outturned annular flange 27 at its outer end, the latter flange being clamped between the adjacent cover plate 23 and the adjacent end of the housing portion 16 by the screws 24. Shims 28 are interposed between each sleeve flange 27 and the adjacent end of the housing portion 16 to adjust the axial position of the sleeve. The outer race members of a pair of axially spaced ball bearings 29 are seated in each carrier sleeve 25, one of the race members abutting against the sleeve flange 26 and the other race member being confined by a snap ring 30 engaging the sleeve.

A pair of axially spaced tubular driving shafts 31, 32 are coaxially journalled in the respective pairs of ball bearings 29. Each tubular shaft has an exterior annular flange 33 near its inner end and an exterior snap ring 34 near its outer end. The inner race members of each pair of the ball bearings 29 are seated on the associated tubular shaft between the flange 33 and the snap ring 34 and are spaced by an interposed collar 35. The inner ends of the tubular shafts 31 and 32 have secured thereto respective bevel gears 36 and 37 which axially abut the respective shaft flanges 33 and are here shown to mesh with an interposed bevel pinion 38 secured to the motor shaft 19. The tubular shafts 31 and 32 will thus be rotated in opposite directions by the motor. Proper meshing of the bevel gearing can readily be effected by means of the shims 28 at the opposite ends of the housing portion 16. The ball bearings 29 are arranged to take both radial and axial thrust.

A driven or output shaft 39 extends coaxially through the cylindrical housing portion 16 and is journalled in ball bearings 40 mounted in tubular bosses 41 formed on the cover plates 23, the bosses also mounting therein shaft seals 42 for the driven shaft. Each ball bearing 40 is confined between a snap ring 43 in the associated boss and a shoulder 44 formed on the driven shaft, thus preventing axial shifting of the driven shaft. The bearings 40 are preferably spring loaded, as by a spring plate 45 disposed between one of the snap rings 43 and the outer race member of the adjacent ball bearing 40. The driven or output shaft 39 preferably extends from both ends of the cylindrical housing portion 16 and is suitably coupled to a load, not shown, as by a pinion 46, Fig. 1. The driving shafts 31 and 32 and the driven shaft 39 form drive transmitting members.

Formed in the output shaft 39 is a coaxial bore 47 in which is axially slidable a control rod or shaft 48, the rod projecting from at least one end of the output shaft. The inner end of the control rod carries a cross pin 49 passing through slots 50 in the output shaft and into a sleeve 51 slidable on the shaft, the rod and sleeve being rotatively coupled to the shaft by the cross pin 49. The sleeve 51 has rotatably mounted thereon a friction clutch ring or floating collar 52, such as of Bakelite, loosely confined between an annular flange 53 at one end of the sleeve and a snap ring 54 at the other end, the outer portion of the clutch ring being interposed between the spaced inner ends of the tubular driving shafts 31 and 32. The opposite ends of the axially shiftable clutch ring 52 are formed with beveled friction clutching faces 55 selectively engageable with cooperating bevelled friction faces 56 formed on the inner ends of the tubular driving shafts.

A pair of helically wound friction clutch springs 57 and 58, both of the same hand, are coaxially disposed within the respective tubular driving shafts 31 and 32. Each spring is preferably formed of edgewise wound flat spring stock, and in the present instance is a left-hand spring. Each of the tubular driving shafts has an inner cylindrical drum surface 59 engageable by the associated spring when the latter is expanded from a self-biased contracted position, as hereinafter described. The adjacent or inner ends of the two aligned clutch springs are anchored to the intervening clutch ring 52, as by respective slot-ended pins 60 brazed to these spring ends and extending into the opposite ends of a bore 61 formed through the clutch ring parallel to the axis of the ring. The other or outer ends of the clutch springs 57 and 58 are anchored to the driven shaft 39 by respective collars 62 splined on the shaft and secured thereto by set screws 63, Fig. 2. Each clutch spring has an inwardly deflected outer end 64, Fig. 2, which extends into a generally tangential or spirally shaped slot 65 formed in the associated collar 62 from the outer periphery of the collar, the extremity of the spring end abutting against the inner end 66 of the slot. A clamping screw 67 extends radially into the collar through an opening 68 in the spring end portion, Fig. 4, and serves to clamp the slotted portion of the collar against the opposite faces of the spring. The splined collars 62 are shiftable along the driven shaft so as to accommodate clutch springs of different length.

The axially shiftable control rod 48 is movable in opposite directions from a central or neutral position and is normally retained in its central position by yieldable centering means designated generally by the numeral 69, Fig. 1. The centering means is here shown to include a collar 70 slidable on an outer end portion of the driven or output shaft 39 and anchored to the control rod 48 by a cross pin 71 passing through slots 72 formed in the output shaft. A spring housing 73 is secured to the output shaft, as by a set screw 74, and has axially spaced walls 75 and 76 between which extends a flat annular flange 77 formed on the collar 70. Compressed spring rings or plates 78 of any conventional type, such as of wavy or fingered construction, are interposed between the collar flange 77 and the housing walls 75 and 76, thus urging the control rod to its central or neutral position, Fig. 1, in which the clutch ring 52 is out of contact with both the tubular driving shafts 31 and 32.

The control rod 47 is axially shiftable in opposite directions from its neutral position by suitable actuating means which is required to exert only a relatively small effort. In the device of Fig. 1, the actuating means is shown to be electromagnetic means comprising a pair of tandem solenoid windings 79 and 80 carried on a stationary spool or bobbin 81 which loosely surrounds the outer end portion of the rod. The bobbin is suitably supported as by a bracket arm 82 rigidly secured to the adjacent end cover plate 23 of the gear housing. At its outer end the control rod carries a coaxial magnetizable core 83 secured thereto as by a screw 84, the core being disposed at a region midway of the solenoid windings so as to be urged inwardly upon energization of the winding 79 and outwardly upon energization of the winding 80. The windings are connected in an electric control circuit 85 including a current source 86 and a three-position switch 87, the switch having an open intermediate position and closed opposite end positions, so as to effect selective energization of the windings.

In the operation of the clutch device of Fig. 1, the motor shaft 19 rotates continuously in the direction of the arrow, driving the tubular shaft 31 in a clockwise direction as viewed from the right-hand end of the device, and driving the tubular shaft 32 in a counter-clockwise direction as viewed from the same end. The various moving parts in the closed housing portion 16 are suitably lubricated as by means of an oil bath. In the neutral condition of the mechanism, the control rod or shaft 48 is in its neutral or intermediate position, as seen in Fig. 1, and the driven or output shaft 39, clutch ring 52, and both of the clutch springs 57 and 58 are at rest in their self-biased contracted position. The clutch ring and clutch springs are out of engagement with the tubular driving shafts 31 and 32 so that there is no drag on these latter shafts and there is no tendency to rotate the driven shaft.

Upon axial displacement of the control rod 48 to the right, as viewed in Fig. 1, by energization of the solenoid winding 79, the clutch ring 52 is brought in friction clutching engagement with the right-hand tubular driving shaft 31 which rotates clockwise as viewed in Fig. 2. The clutch ring 52 is thereby rotated in clockwise direction on its supporting sleeve 51, the latter tending to remain stationary on the driven shaft 39. The pin-carrying end of the clutch spring 59, which is coupled to the clutch ring, is thus energized and caused to turn clockwise, expanding one or more coils or convolutions of the spring into frictional engagement with the interior drum surface 59 of the tubular drive shaft 31, whereupon the entire spring is rotated, driving the collar 62 and the driven shaft 39 in clockwise direction. The torque on the clutch spring is transmitted to the collar 62 at the slotted portion of the collar, tending to bring the end of the spring against the inner end 66 of the slot 65 in the collar. The control rod 48 rotates with the driven shaft, and turns freely in the solenoid bobbin 81, thus avoiding drag on this rod. Upon deenergization of the solenoid winding 79, the control rod shifts to the left to its neutral or intermediate position under urge of the centering device 69, bringing the clutch ring 52 out of contact with the tubular driving shaft 31, whereupon the clutch spring 51 contracts out of engagement with the inner drive surface of this tubular shaft, uncoupling the driven shaft from the tubular driving shaft. When the solenoid winding 80 is energized the control rod is shifted to the left, as viewed in Fig. 1, engaging the clutch ring 52 with the tubular drive shaft 32 and causing the driven shaft 39 to be rotated in reverse direction by the similar clutching action of the coil spring 57.

The two hollow driving shafts 31 and 32 are here shown to be driven in opposite directions at the same rate of speed, but they could be driven at different absolute speeds. Also, in some instances the two hollow driving shafts may be driven in the same direction at different speeds, in which case the clutch springs would be oppositely wound instead of being of the same hand.

In the modification of Fig. 5 the clutch mechanism of the invention is embodied in a tapping machine. The electromagnetic actuator is omitted and the outer end of the control rod or shaft 48 extends downwardly and carries a chuck 88 for a tap 89. The tap is adapted to thread a hole in a work piece 90 supported on a table 91 by a hold-down 92. The clutch mechanism is suitably supported for vertical reciprocation, as in the manner of the drill press head, to advance and retract the tap. Upon downward displacement of the clutch mechanism the tap is brought against the work piece, relatively shifting the control rod or shaft 49 with respect to the driven shaft 39 with which it is drivingly connected, causing the tubular driving shaft 31 to transmit torque to the driven shaft 39 through the clutch spring 57, as hereinbefore described. The driven shaft 39 thereby transmits torque to the control rod or shaft through the cross pin 49, turning the tap into the work piece in a clockwise direction as viewed from above. At the end of the tapping operation, the clutch housing is urged upwardly, effecting transmission of torque from the tubular driving shaft 32 through the clutch spring 58 to the driven shaft 39, thus rotating the clutch counterclockwise to back the tap out of the work piece. As soon as the tap is freed from the work piece, the centering device 69 moves the control rod to neutral position, stopping the rotation of the driven shaft 39 and the control rod. In some instances, a torque-limiting rheostat 93 is connected in the motor circuit 94.

The modified form of coil spring clutch device shown in Figs. 6 to 12 is arranged to drive a rotary output member in one direction and is electromagnetically controlled. The clutch device includes a casing or housing 115 consisting of housing sections 116, 117, and 118. The housing section 116, which is preferably formed of non-magnetic metal, constitutes a part of a gear head of an electric motor and has journalled therein an input shaft 119 which may be either the motor shaft or a shaft drivingly connected to the motor shaft. The housing section 116 has a lateral opening 120 of circular shape formed in an annular boss 121 provided with an inner rabbet 122. The housing section 117, which is also non-magnetic, forms a cupped bearing cap of cylindrical shape and has a peripheral rabbet 123. The housing section 118, which is formed of magnetizable metal, is of tubular shape and is interposed in aligned relation between the cap-forming section 117 and the boss 121 of the housing section 116, the opposite ends of the tubular housing section being annularly rabbeted to interfit with the companion housing sections. The three housing sections are secured together by headed screws 124 which extend parallel to the axis of the sections 117 and 118 and are threaded into the housing section 116. The tubular section 118 has bores 125 formed longitudinally therethrough to receive the screws, and has a longitudinal slot 26 cut therethrough along one of the bores to minimize eddy or secondary currents in the tubular section when it is magnetized as hereinafter described. The slot is closed by the associated screw.

A horizontally extending output or driven shaft 127 is journalled at its opposite end portions in a pair of ball bearings 128 and 129 mounted in the housing sections 116 and 117, respectively, and has an output pinion 130 formed on one of its end portions. The output shaft, which is confined against axial displacement, extends crosswise of the input shaft 119 and is disposed coaxially of the tubular housing section 118. Within the housing section 116 the output shaft 127 has an enlarged cylindrical portion 131 presenting a drum surface 132. A tubular driving member or shaft 133 in the form of a hubbed sleeve is rotatably mounted on the output shaft enlargement 131 and is provided with external spline teeth 134 at one end portion. A worm wheel 135, such as of Bakelite, is pressed onto the spline teeth 134 and meshes with a worm 136 secured to the input shaft 119. A thrust washer 137, such as of fibre, is placed between the inner race member of the ball bearing 128 and the adjacent end of the tubular drive shaft 133.

The other end of the tubular drive shaft 133 has a driving connection with a coaxial spring housing or casing comprising a tubular outer member or cap 138 and a tubular inner member 139 pressed into the cap. The cap has an inturned end flange 140 abutting against an end face of the worm wheel 135 and provided with spline teeth 141 meshing with the drive sleeve spline teeth 134. The inner spring housing member 139 has an outturned end flange 142 abutting against the end of the cap remote from the toothed end flange 140. The driving shaft 133 and driven shaft 127 constitute drive transmitting members.

A helically wound clutch spring 143, here shown to be a right-hand spring, is disposed in an annular space 144 formed between the output shaft portion 131 and the inner bore of the spring housing member 139 and is adapted to be contracted from a self-biased expanded position into gripping engagement with the output shaft, as hereinafter described. The clutch spring has tangentially extending opposite end portions 145 and 146 rigidly secured to respective slot-ended cylindrical pins 147 and 148, as by brazing, the pins extending parallel to the spring axis. The spring end portion 145 is disposed in a tangential notch 149 formed in the spring housing member 139, and the associated pin 147 is seated in a semi-cylindrical pocket 150 formed in the outer periphery of this spring housing member and in a complementary semi-cylindrical groove 151 formed along the interior of the cap member 138, thus anchoring this end of the spring to the driving member of the clutch.

A floating energizing disk or clutch ring 152 of magnetizable metal is rotatably mounted on the output shaft and is loosely confined between the spring housing flange 142 and a brake collar 153 which latter is suitably secured to the shaft as by one or more set screws 154. The periphery of the floating clutch ring 152 is slightly spaced from the inner cylindrical surface of the tubular housing section 118. The clutch disk or ring 152 has a concentric circular recess 155 receiving the adjacent end of the clutch spring and the adjacent end of the shaft enlargement 131. The spring end pin 148 fits in an opening 156 formed through the clutch ring, the ring being cut away at 157 to provide clearance for the tangentially extending end 146 of the spring. By applying a relatively small braking force on one face of the clutch ring 152, as hereinafter described, the spring will be contracted into engagement with the cylindrical periphery 132 of the enlarged portion 131 of the driven shaft, thus energizing one or more convolutions of the spring into clutching engagement with the driven shaft for transmitting torque from the hollow drive shaft 133 to the driven shaft 127.

A tubular magnetizable solenoid core 158 concentrically surrounds the output or driven shaft 127 between the brake collar 153 and the ball bearing 129, and has an annular end flange 159 disposed adjacent this bearing and peripherally secured between the inner face of the housing member 117 and an annular shoulder 160 on the adjacent rabbeted end of the tubular housing member 118, the latter member forming a sleeve for the solenoid. The brake collar is slightly spaced from the adjacent end of the core 158. A solenoid winding 161 surrounds the core 158 and is supplied with direct or alternating current through conductor wires 162 passing through the end housing member 117. The conductor wires 162 form part of an electric control circuit 163 including a source of current 164 and a control switch 165.

In the operation of the device of Fig. 6, the motor shaft 119 rotates continuously, driving the tubular drive shaft 133 in a counterclockwise direction as viewed from the left-hand end of Fig. 6. In the neutral or unclutched condition of the mechanism, the solenoid winding 161 is deenergized and the driven or output shaft 127 and attached brake collar 153 are at rest. The clutch spring, spring housing, and floating clutch ring rotate continuously with the worm gear 135. In its released condition, the clutch spring 143 is expanded into light contact with the bore of the spring housing member 139 and is out of contact with the drum surface 132 of the driven shaft. The clutch ring or disk 152 rides loosely on the driven shaft and is loosely confined between the spring housing and the then stationary brake collar 153.

When the clutch of Fig. 6 is to be engaged, the solenoid winding 161 is energized by closing the switch 165, establishing a magnetic flux, as indicated by arrows in Fig. 6, in a magnetic circuit comprising the tubular core 158, flange 159, tubular housing section 118, floating clutch ring 152, and brake collar 153, causing the rotating clutch ring to be urged into frictional engagement with the then stationary brake collar. The end of the clutch spring connected to the clutch ring thus tends to lag in its rotation, effecting contraction of one or more spring coils or convolutions into clutching engagement with the cylindrical drum surface 132 of the driven or output shaft 127. The driven shaft is thereby quickly coupled to the driving shaft with a smooth clutching action to transmit torque to the driven shaft. The brake collar 153 rotates with the driven shaft and is out of contact with the solenoid core, so that there is no appreciable drag on the rotating parts. The longitudinally split housing section 118 minimizes secondary or eddy currents therein when the solenoid winding is energized by alternating current.

The clutch devices of the invention can be incorporated in apparatus of various types, including servo-mechanisms and servo-assisted mechanisms. The reversible clutch device of Fig. 1, for example, can be embodied in power-operated steering mechanism, such as for automotive use.

In the form of the invention shown in Figs. 13 and 14, reversible coil spring clutch means of the invention is incorporated in a servo-mechanism forming a power steering mechanism for an automotive vehicle. The mechanism includes a reversible coil spring clutch device 200 which is substantially the same as that of Fig. 1 except for omission of the electromagnetic actuating means, and includes a reversible output shaft 39' and control rod 48' corresponding to the shaft 39 and control rod 48 of Fig. 1. The output shaft 39', in addition to being power-operated, is capable of manual operation by a steering wheel 201 which also controls the clutch means, as hereinafter described. One end of the shaft 39' is connected to an extension shaft 202 coupled to a steering gear 203 of any conventional type here shown to comprise a worm 204 and worm wheel 205 mounted in a casing 206, the worm being connected to the shaft 202, and the worm wheel being connected to a steering arm 207.

The clutch casing includes an end cover 23' having a tubular extension 208 in which a sleeve 209 is journalled and confined against axial displacement, as by a split ring 210 fitting in an annular groove 211 in the sleeve and secured to the cover extension by screws 212. The manually operable steering wheel 201 has its hub portion secured to the outer end of the sleeve 209.

A helical gear 213 is fastened to the end of the axially shiftable control rod or shaft 48' and has a sleeve portion 214 which is splined at 215 to the end portion of the output shaft 39'. The helical gear 213 coaxially interfits with an internal helical gear 216 formed in the sleeve 209, thus providing a splined cam-forming connection or coupling by which torque can be transmitted from the steering wheel to the output shaft. The interfitting gear teeth of the helical gears also provide a camming action to effect the required slight axial displacement of the control rod. The tooth pitch angle of the gears can be selected to obtain the desired axial pressure on the control rod. As the tooth pitch angle is reduced, a greater proportion of the total torque on the output shaft is furnished by the steering wheel.

The output shaft is shown to include a centering device 69, although in some instances this device may be omitted. The clearance spaces between the bevelled control clutch faces 55 and 56 is preferably quite small. In fact, these faces may be in light contact, with an intervening oil film, since any slight drag at one set of clutch faces will be offset by an equal slight drag at the other set of clutch faces.

The electric motor 18 is driven continuously from the electrical system of the vehicle, and the motor circuit 94 preferably includes a rheostat 93 to adjust the torque delivered by the motor. In some instances the power input 19 may be driven from the vehicle engine, as through a belt pulley 217 on the motor shaft, in which event the motor need not be supplied with current, or may be omitted.

In operation, the input or motor shaft 19 runs continuously but no power is transmitted therefrom to the output shaft 39' unless axial pressure is applied to either of the energizing clutches 55, 56. Assuming the vehicle to be moving in a straight course, the control clutch ring 52 is in neutral position so that there is no tendency to turn the output shaft. When the vehicle is to be turned the steering wheel 201 is turned in the desired direction, causing some torque to be transmitted to the output shaft through the internally toothed portion 216 of the sleeve 209 and meshing coaxial gear 213 and through the keyed or splined connection 215 between the gear 213 and the output shaft 39'. Simultaneously, however, the helical gear 213 and connected control rod 48' are urged axially by the camming action of the gear 216 on the gear 213 in a direction effecting engagement of one of the spring clutches 57 and 58 to apply additional torque to the output shaft 39' from the motor shaft 19 (or from the vehicle engine). Normally, nearly all of the torque on the output shaft is provided by the motor, but the proportion of torque can be adjusted by the rheostat 93. As soon as the output shaft turns, the axial pressure on the control rod is relieved, thus releasing the spring clutch which was previously engaged and restoring the control clutch ring 52 to neutral position. The same steering action will occur when the vehicle is at rest or when moving slowly, as during parking of the vehicle.

If the motor 18 should fail or be at rest, the vehicle can still be steered by the direct action of the steering wheel.

I claim:

1. In a clutch mechanism, a pair of coaxial relatively rotatable drive transmitting members one of which has a clutch drum surface, a coil spring having one end drivingly connected to the other of said members, said coil spring being movable into and out of friction clutching engagement with said drum surface, and control means for said spring including an axially shiftable control clutch ring coaxial with said rotatable members and drivingly connected to the other end of said spring, said ring having a lateral friction clutching face and movable axially into and out of frictional engagement with the drive transmitting member which has the drum surface.

2. In a clutch mechanism, a pair of coaxial relatively rotatable drive transmitting members one of which has a clutch drum surface, an axially shiftable control clutch ring coaxial with said rotatable members and having a lateral friction clutching face, said ring being axially movable into and out of frictional engagement with the member having the drum surface, a coil spring having an end drivingly connected to the other rotatable member and having its other end drivingly connected to said clutch ring, said coil spring having a releasable frictional engagement with said drum surface to effect transmission of torque between said rotatable members, and actuating means for said control clutch ring to energize said coil spring when said clutch ring is axially shifted into frictional engagement with the rotatable member having the drum surface.

3. In a clutch mechanism, a pair of coaxial relatively rotatable drive transmitting members one of which has a clutch drum surface, a coil spring having one end drivingly connected to the other of said members, said coil spring being movable into and out of friction clutching engagement with said drum surface, and control means for said spring including an axially shiftable control clutch ring drivingly connected to the other end of said spring and axially movable into and out of frictional engagement with the drive transmitting member which has the drum surface, said control means further including electromagnetic means for axially shifting said control clutch ring and including a rod member extending coaxially within said rotatable members.

4. In a clutch mechanism, a pair of coaxial relatively rotatable hollow driving members having respective interior drum surfaces, a rotatable driven member disposed coaxially within said driving members, a pair of selectively active friction coil springs respectively disposed within said driving members and expansible into clutching engagement with the associated drum surfaces, said coil springs being aligned and axially spaced and each having an inner end and an outer end, the outer ends of said springs being drivingly connected with said driven member, an axially shiftable friction clutch ring surrounding said driven member between said springs and having the inner ends of said springs coupled thereto, said clutch ring having opposite friction clutch end faces and being selectively frictionally engageable with said driving members, and actuating means for axially shifting said clutch ring to effect selective clutching engagement of said springs.

5. In a clutch mechanism, a pair of coaxial relatively rotatable hollow driving members having respective interior drum surfaces, a rotatable driven member disposed coaxially within said driving members, a pair of selectively active friction coil springs respectively disposed within said driving members and expansible into clutching engagement with the associated drum surfaces, said coil springs being aligned and axially spaced and each having an inner end and an outer end, the outer ends of said springs being drivingly connected with said driven member, an axially shiftable friction clutch ring surrounding said shaft between said springs and having the inner ends of said springs coupled thereto, said clutch ring having opposite friction clutch end faces and being selectively frictionally engageable with said driving members, and electromagnetic actuating means for axially shifting said clutch ring to effect selective clutching engagement of said springs.

6. In a clutch mechanism, a pair of coaxial relatively rotatable hollow driving members having respective interior drum surfaces, said driving members having spaced adjacent inner ends provided with opposed friction clutching surfaces, a rotatable driven member disposed coaxially within said driving members, a pair of selectively active friction coil springs respectively disposed within said driving members and expansible into clutching engagement with the associated drum surfaces, said coil springs being aligned and axially spaced and each having an inner end and an outer end, the outer ends of said springs being drivingly connected with said driven member, an axially shiftable clutch ring surrounding said shaft between said springs and having the inner ends of said springs coupled thereto, said clutch ring being interposed between said driving members and selectively frictionally engageable with the spaced friction clutching surfaces of said driving members, actuating means for axially shifting said clutch ring in opposite directions to effect selective clutching engagement of said springs, and centering means for yieldably urging said clutch ring to a neutral position.

7. In a clutch mechanism, a pair of coaxial relatively rotatable drive transmitting members disposed one within the other, the outer member having therein a clutch drum surface, a coil spring having one end drivingly secured to the inner member, said coil spring being expansible into clutching engagement with said drum surface, an axially shiftable control clutch ring having the other end of said spring coupled thereto and rotatably mounted on said inner rotatable member, said clutch ring being normally out of contact with said outer drive-transmitting member and being frictionally engageable with said outer member, and actuating means for axially shifting said clutch ring into clutching engagement with said outer member to effect clutching engagement of said spring.

8. In a clutch mechanism, a rotatable driving member having an inner clutch drum surface, a rotatable driven member disposed coaxially within said driving member, a coil spring having one end drivingly connected to said driven member, said spring being expansible into friction clutching engagement with said drum surface for causing said driving member to drive said driven member, an axially shiftable control clutch ring secured to the other end of said spring and being frictionally engageable with said driving member to energize said spring to clutching condition, and actuating means for said control clutch ring, said ring being normally out of contact with said driving member.

9. In a clutch mechanism, a pair of coaxial relatively rotatable drive transmitting members one of which has a clutch drum surface, a coil spring having one end drivingly connected to the other of said members, said coil spring being movable into and out of friction clutching engagement with said drum surface, and control means for said spring including an axially shiftable control clutch ring operatively connected with the other end of said spring and having a releasable frictional engagement with the drive transmitting member which has the drum surface, said control means further including an actuating rod axially shiftable in one of said drive transmitting members and operatively connected to said clutch ring for axially moving said ring to its frictional engagement position.

10. In a clutch mechanism, a pair of coaxial driving members rotatable in opposite direction, a driven member coaxial with said driving members, a pair of selectively active clutch springs associated with said respective driving members, said driving members having respective clutch drum surfaces, each coil spring being movable into and out of friction clutching engagement with the associated drum surface and having one end drivingly connected to said driven member, and an axially shiftable control friction clutch ring operatively connected to the other ends of said springs and selectively frictionally engageable with said driving members for causing selective clutching engagement of said spring.

11. In a clutch mechanism, a pair of coaxial relatively rotatable hollow driving members having respective interior drum surfaces, a rotatable driven member disposed coaxially within said driving members, a sleeve axially shiftable on said driven shaft and drivingly connected therewith, a control clutch ring journalled on said sleeve and axially shiftable therewith for selective frictional engagement with said driving members, a pair of selectively active friction coil springs respectively disposed within said driving members and expansible into frictional clutching engagement with said driven surfaces, one end of each of said springs being drivingly connected to said clutch ring and the other ends of said springs being drivingly connected to said driven member, and control means for axially shifting said sleeve and clutch ring for selectively frictionally engaging said ring with said driving members to initiate expansion of the associated clutch spring into frictional clutching engagement with the corresponding driving member, said ring when in neutral position being out of contact with said driving members.

12. In a clutch mechanism, a pair of coaxial driving members rotatable in opposite directions, a rotatable driven member coaxial therewith, selectively active coil spring clutches operatively connecting said driving members and driven member, clutch actuating means for selectively engaging said coil spring clutches including an axially shiftable control friction clutch element and an axially shiftable control rod operatively connected to said element for shifting said element in opposite directions from an intermediate position, said control rod extending axially in said driven member and rotatable therewith, said actuating means further including a cross member extending radially through said driven member and drivingly connecting said control rod and clutch element, and said rod forming a tool carrier and being axially shiftable by tool pressure in opposite directions to effect selective engagement of said clutches.

13. In a clutch mechanism, a power input shaft, an output shaft, a pair of selectively operable coil spring clutches operatively connected between said power input shaft and said output shaft for driving said output shaft in opposite directions, manually operable means for turning said output shaft in opposite directions, friction control clutches operatively connected to said respective coil spring clutches for selectively energizing said coil spring clutches, and actuating means controlled by said manually operable means for selectively engaging said friction clutches.

14. In a clutch mechanism, a power input shaft, an output shaft, a pair of selectively operable coil spring clutches coaxial with said output shaft and operatively connected between said input shaft and output shaft, clutch controlling means including a control rod coaxial of said clutches and shiftable in opposite directions for selectively engaging said clutches, an externally toothed helical gear secured to said control rod, a manually operable member coaxial with said output shaft and operatively connected therewith for turning said output shaft in opposite directions, said manually operable member having internal helical teeth interfitting with said helical gear to provide a splined cam connection for axially urging said control rod in either direction.

15. In a clutch mechanism, a power input shaft, an output shaft, a pair of selectively operable coil spring clutches operatively connected between said power input shaft and output shaft for driving said output shaft in opposite directions, clutch-controlling means including selectively operable friction control clutches for said respective coil spring clutches and further including a control member shiftable axially of said friction clutches in opposite directions for selectively engaging said friction clutches to energize the respective coil spring clutches, a manually operable member rotatable in opposite directions for turning said output shaft in opposite directions, and actuating means operatively connected with said manually operable member for axially urging said control member in opposite directions by rotation of said manually operable member in corresponding direction.

16. In a clutch mechanism, a power input shaft, an output shaft, a pair of selectively operable coil spring clutches operatively connected between said power input shaft and output shaft for driving said output shaft in opposite directions, clutch-controlling means including a friction clutch control member shiftable axially of said coil spring clutches in opposite directions for selectively energizing said clutches, a manually operable member rotatable in opposite directions and drivingly connected to said output shaft for turning said output shaft in opposite directions, and actuating means operatively connected with said manually operable member for axially urging said control member in opposite directions by rotation of said manually operable member in corresponding direction, said actuating means including a cam-forming drive coupling operatively connected to said manually operable member and said control member for exerting torque on said output shaft and axial force on said control member, said drive coupling comprising a pair of concentric coupling members one of which has a helical spline-forming tooth and the other of which has a helical groove interfitting with said tooth.

References Cited in the file of this patent

UNITED STATES PATENTS

| Re. 22,767 | Starkey | June 11, 1946 |
| 1,602,504 | Readey | Oct. 12, 1926 |
| 2,383,295 | Dodge | Aug. 21, 1945 |
| 2,483,950 | Watson et al. | Oct. 4, 1949 |
| 2,487,280 | Starkey | Nov. 8, 1949 |
| 2,516,269 | Starkey | July 25, 1950 |
| 2,700,442 | Gorske | Jan. 25, 1955 |
| 2,784,610 | Block | Mar. 12, 1957 |